United States Patent [19]

Gilbert

[11] 4,236,235

[45] Nov. 25, 1980

[54] INTEGRATING HYDROPHONE SENSING ELEMENTS

[75] Inventor: Daniel E. Gilbert, Maple Valley, Wash.

[73] Assignee: The Boeing Company, Seattle, Wash.

[21] Appl. No.: 936,445

[22] Filed: Aug. 24, 1978

[51] Int. Cl.[3] .................. H04B 13/00

[52] U.S. Cl. .................. 367/157; 310/800; 367/162; 367/165

[58] Field of Search .................. 310/800; 340/8-14; 367/157, 159, 167, 165, 173, 176

[56] References Cited

U.S. PATENT DOCUMENTS

| | | | |
|---|---|---|---|
| 3,277,433 | 10/1966 | Toulis | 340/10 |
| 3,308,423 | 3/1967 | Massa, Jr. | 340/8 R |
| 3,792,204 | 2/1974 | Murayama et al. | 310/800 |
| 3,832,580 | 8/1974 | Yamamuro | 310/800 |

*Primary Examiner*—Harold J. Tudor
*Attorney, Agent, or Firm*—Thomas H. Murray; Clifford A. Poff

[57] ABSTRACT

An integrating hydrophone sensing element is provided having improved sensitivity and capability of withstanding high pressures. The sensing element consists of a rigid cylinder with semicylindrical sensing surfaces rigidly connected to the cylinder at diametrically-opposite points. A membrane of piezoelectric polymer material extends diametrically across the cylinder and is attached to the cylinder at points displaced 90° from the connections of the sensing surfaces. Vibration of the cylinder by acoustic signals transmitted from the sensing surfaces causes vibration of the membrane and produces an electrical output signal.

5 Claims, 2 Drawing Figures

INTEGRATING HYDROPHONE SENSING ELEMENTS

BACKGROUND OF THE INVENTION

The present invention relates to sensing elements or transducers for hydrophones, and more particularly to an integrating sensing element using piezoelectric polymer membranes.

Hydrophones are used to sense underwater acoustic signals or sounds for various purposes, as in sonar systems, for example, and may be deployed singly or in arrays of various configurations which may sometimes be at a substantial depth, depending on the particular purpose. The performance of a hydrophone, of course, depends on the sensitivity of the sensing elements which respond to the acoustic energy applied to the hydrophone, and there is a need for inexpensive sensing elements of small size with better sensitivity than those presently available and capable of withstanding relatively high hydrostatic pressures so that they can be used at considerable depths.

Prior attempts to improve the sensitivity of hydrophone sensing elements have been based on the approach of increasing the surface area of the face of the sensing element. This can be done by utilizing conventional ceramic materials for the sensing element, or by using piezoelectric polymer material configured in a conventional ceramic element design. The use of conventional ceramics in this way has not been successful because the maximum allowable surface area of a ceramic material is limited by the brittleness of ceramics and the difficulty of manufacturing ceramics in large sizes, while the ceramic is considerably more dense than sea water so that control of the hydrophone buoyancy becomes impractical for a large volume ceramic sensing element. The use of piezoelectric polymers in ceramic-type designs has also been unsuccessful because of unwanted coupling between various modes of vibration in the polymer, which prevents the development of the full potential advantage of such polymers.

SUMMARY OF THE INVENTION

The present invention provides an integrating hydrophone sensing element which significantly improves the sensitivity performance and which can withstand relatively high hydrostatic pressures without adversely affecting the performance.

In accordance with the invention, an integrating surface is used to respond to the total acoustic signal energy or pressure impinging on its surface and to sum the acoustic pressures and transmit the total pressure to a piezoelectric polymer membrane. The integrating surfaces preferably take the form of two opposed, semicylindrical rigid surfaces which are mechanically attached to a rigid cylinder at diametrically-opposite points. A piezoelectric polymer membrane extends across the interior of the cylinder and is attached to the opposite sides at points displaced 90° from the points of attachment of the integrating surfaces. Electrical contacts are provided on opposite sides of the polymer membrane. The acoustic or signal energy picked up by the integrating surfaces is summed and applied to the cylinder at the points of attachment. This causes the cylinder to contract at these points and to expand at the points of attachment of the membrane, so that the membrane is stretched and caused to vibrate which produces an electrical output signal. A water-impermeable cover such as an elastomeric tubing is preferably placed over the outside of the device to maintain a water-tight housing, and the cylindrical configuration makes it possible to design the device to withstand quite high hydrostatic pressure levels.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
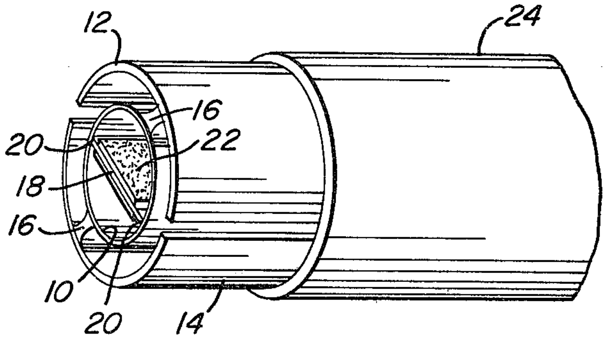
FIG. 1 is a perspective view showing one end of a sensing element embodying the invention.
Figure 2:
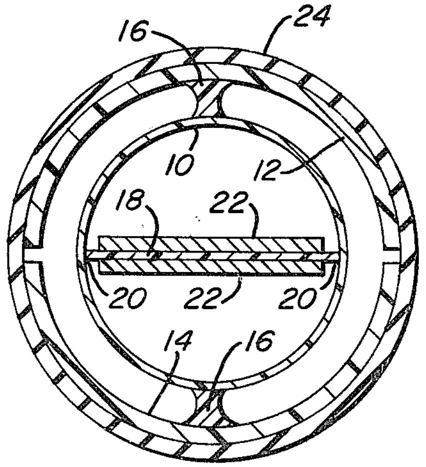
FIG. 2 is a transverse, sectional view of the device of FIG. 1.

As shown in the drawing, the sensing element or transducer of the present invention is of generally cylindrical configuration. The device consists of a rigid cylinder 10 to which the integrating signal sensing surfaces 12 and 14 are attached. The surfaces 12 and 14 are rigid, semicylindrical surfaces disposed on opposite sides of the cylinder 10 coaxially therewith, and are connected to the cylinder 10 by substantially rigid mechanical connections 16 at the centers of the surfaces 12 and 14. The connections 16 are located at diametrically opposite points on the cylinder 10, as shown, and the semicylindrical surfaces 12 and 14 extend circumferentially in both directions from each of the connections 16. The surfaces 12 and 14 and the connections 16 extend axially the full length of the cylinder 10. The integrating surfaces 12 and 14 and the cylinder 10 may be made of any suitable material having the necessary properties for operation at the intended depth of submergence and with the proper elastic properties. The preferred material is a polycarbonate resin which can be molded or extruded to the desired shape, since this type of material has good toughness and impact strength as well as dimensional stability and meets all the necessary requirements. Any other suitable rigid material could, of course, be used. The surfaces 12 and 14 may be attached or bonded to the connections 16 and the cylinder 10 in any desired manner, or the entire assembly of the cylinder 10 and surfaces 12 and 14 may be made as a single integral device. If desired, the cylinder 10, and the space between the surfaces 12 and 14 and the cylinder, could be filled with a suitable fluid to increase the ability of the device to withstand hydrostatic pressure. Such a fluid could be an inert gas such as nitrogen or helium, or a liquid such as a dielectric oil.

The sensing element itself is a piezoelectric polymer membrane 18 which extends transversely across the cylinder 10 and is attached to the interior of the cylinder at diametrically opposite points 20 which are displaced 90° from the connection points 16. Polymeric piezoelectric materials are known which are capable of providing electrical output signals in response to mechanical deformation or vibration, and such materials are available in the form of thin films or membranes. The preferred material for the membrane 18 is polyvinylidene fluoride, although other suitable polymers could be used. The polymer membrane is of course oriented and poled, by methods well known in the art, such as by stretching followed by heating in an electric field, to maximize the piezoelectric effect in the direction of vibration of the membrane. Two or more adjacent membranes might be used if necessary to obtain the desired electrical impedance or capacitance of the membrane. Electrical contacts 22 are applied on both sides of the membrane 18 to enable an electrical signal to be obtained. The membrane 18 is stretched across the diameter of the cylinder 10 and extends longitudinally for the entire length of the cylinder in order to obtain maximum sensitivity. A water-impermeable tubing or sleeve 24 is placed over the outside of the assembly to make it substantially water-tight. Any suitable water-tight material, preferably elastomeric, could be used for this purpose.

In use, the entire device is submerged in water to pick up sounds or acoustic signals transmitted through the water. The length of the cylinder 10 and the dimensions of the surfaces 12 and 14 are made great enough to obtain the desired sensitivity. When an acoustic signal is received by the device, the energy is absorbed and integrated by the surfaces 12 and 14, and the individual sums are transmitted to the opposing connections 16 from the respective surfaces. The total acoustic or signal energy is thus applied to the cylinder 10 at these two points. This causes the cylinder to contract at the points 16 and to expand correspondingly at the points 20, thus stretching the polymer membrane 18. The signals picked up by the surfaces 12 and 14 are, of course, vibratory and cause the cylinder 10 to vibrate correspondingly in the mode indicated, that is, by alternate contraction and expansion along the diameters between the points 16 and 20. This results in vibration of the polymer membrane 18 in the diametric plane of the cylinder 10 between the points 20, and results in an electrical signal on the contacts 22 which can be picked up by suitable sensing circuits either as a voltage or as a current flowing in a closed circuit connecting the contacts.

It will be seen that a hydrophone sensing element is thus provided which can be designed to have good sensitivity and to withstand the hydrostatic pressures at relatively great depths. The sensitivity is obtained by the use of the integrating sensing surfaces 12 and 14 which have sufficient area to pick up and integrate the total acoustic energy applied to the device by an incoming sound or signal so that the total energy is transmitted to the cylinder 10 to cause it to vibrate as described. The polymer membrane 18 should be stretched across the cylinder in the plane of maximum expansion of the cylinder, which is 90° from the connection points 16, so that maximum stretching of the polymer membrane occurs. Since the membrane extends for the full length of the cylinder 10 and vibrates in the plane of maximum expansion, maximum sensitivity is obtained. It will also be seen that by suitable choice of materials and proper design, the device can be made capable of withstanding high hydrostatic pressures so that it can be used at substantial depths, and it can readily be made water-tight in the manner described.

I claim as my invention:

1. A hydrophone sensing element comprising a rigid cylinder, two rigid sensing surfaces disposed on opposite external sides of said cylinder and mechanically connected thereto essentially at two diametrically opposite points, and a piezoelectric polymer membrane extending diametrically across the cylinder and attached to the interior of the cylinder at two points displaced 90° from said first-mentioned points to tension the membrane with energy applied through the cylinder from the sensing surfaces.

2. A hydrophone sensng element as defined in claim 1 in which said sensing surfaces are rigid, semicylindrical elements mechanically connected to the cylinder at their centers.

3. A hydrophone sensing element as defined in claim 2 and including a water-impermeable covering over said sensing surfaces.

4. A hydrophone sensing element as defined in claim 2 in which said polymer membrane extends axially for the full length of the cylinder.

5. A hydrophone sensing element as defined in claim 2 including electrical contact means on opposite sides of said polymer membrane.

* * * * *